United States Patent Office 3,433,768
Patented Mar. 18, 1969

3,433,768
PREPARATION OF ISOCYANATE MODIFIED RESORCINOL FORMALDEHYDE RESIN
Robert A. Muhlberger, Erie, Pa., and Edward J. Lamby, Schenectady, N.Y., assignors to Schenectady Chemicals, Inc., Schenectady, N.Y., a corporation of New York
No Drawing. Filed Feb. 17, 1967, Ser. No. 616,770
U.S. Cl. 260—54
Int. Cl. C08g 5/18, 22/08, 51/78
9 Claims

ABSTRACT OF THE DISCLOSURE

Resorcinol is reacted with aqueous formaldehyde and the resin dehydrated. The molten resin the presence or absence of a solvent is reacted with an organic polyisocyanate.

---

The present invention relates to the preparation of resorcinol-formaldehyde-polyisocyanate resins.

It has been proposed in the past to prepare resorcinol-formaldehyde-polyisocyanate resins, note Rye et al. Patents 3,226,276 and 3,268,467. Such resins are disclosed by Rye et al. as being useful for adhering polyester cord to rubber in the manufacture of tires.

Rye et al. discloses the preparation of a resorcinol-formaldehyde resin having a viscosity of 750 cps. at 60% solids in water. The aqueous resin is then reacted over a 48 hour period at 72° F. with polymethylene polyphenylisocyanate (PAPI), note Rye et al. 3,268,467 Example 2. The reaction procedure requires an 8 hour settling period and decantation of the liquid blocked polyisocyanate resin. This procedure has the disadvantage that it is lengthy and time consuming. In addition the reaction is carried out in an aqueous medium where side reactions of the isocyanate reactant cannot be avoided. Since the intent of the isocyanate reaction is to form a urethane link between the resorcinol hydroxyl group and the isocyanate group, any side reactions of the isocyanate group with water hinder the formation of the desired product and reduce the yield thereof. Also undesired impurities are introduced into the desired product. Hydrolysis of the isocyanate leads to the formation of a carbamic acid which, being unstable, eliminates carbon dioxide to form an amine. This amine condenses with available isocyanate groups to produce a polyurea.

It is an object of the present invention to prepare stable, solid resorcinol - formaldehyde - polyisocyanate resins.

Another object is to reduce the processing time required to prepare resorcinol-formaldehyde-polyisocyanate resins.

A further object is to eliminate the possibility of the formation of aqueous hydrolysis products in the formation of resorcinol-formaldehyde-polyisocyanate resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting resorcinol with aqueous formaldehyde, stripping the water from the condensate to form a molten resin and reacting the molten resin with a polyisocyanate in the presence or absence of a polar oxygenated organic solvent.

The resorcinol-formaldehyde-polyisocyanate resin thus prepared can be used in making tire cord dips, e.g. for polyethylene terephthalate (polyester) tire cords. The Rye et al. patents, for example, show the manner of so using the resin. The resin is also useful in other adhesive applications. Thus it can be used for metal to metal adhesion, e.g. steel to steel, steel to aluminum or aluminum to aluminum.

The resorcinol-aqueous formaldehyde reaction is carried out at elevated temperature, preferably at reflux with or without a catalyst. The mole ratio of formaldehyde to resorcinol can vary from 0.1 to 1 up to 1.0 to 1. Preferably, 0.25 to 0.65 moles of formaldehyde are employed per mole of resorcinol.

When a catalyst is employed it can be basic such as barium hydroxide, calcium oxide, zinc oxide, magnesium oxide, calcium hydroxide, magnesium hydroxide, barium oxide, sodium hydroxide or potassium hydroxide. Acidic catalysts can also be used, e.g. oxalic acid. The preferred catalyst is barium hydroxide octahydrate.

After reaction of the aqueous formaldehyde with the resorcinol the reaction mixture is distilled to remove water and give a molten resin essentially free of water. The molten resin is then reacted with a polyfunctional isocyanate either in the melt or in a solvent. This reaction is normally begun either at about 125–150° C. or at the reflux temperature of the solvent.

As solvents there can be employed polar oxygenated solvents containing no active hydroxyl groups. The preferred solvents are ketones, ethers and esters, and mixtures of said polar oxygenated solvents with aromatic hydrocarbons like xylene, toluene and the like. Examples of suitable solvents include Cellosolve acetate (2-ethoxyethyl acetate), methyl isobutyl ketone, methyl ethyl ketone, acetone, dibutyl ether, butyl acetate, ethyl butyrate, propyl propionate, 2-ethoxyethyl butyrate, isoamyl acetate, ethyl valerate, methyl benzoate, diamyl ether, ethyl n-butyl ether.

When a solvent is employed it is removed after the isocyanate reaction is complete by stripping the solvent at temperatures up to 200° C. in a vacuum.

As the polyisocyanate there can be employed organic polyisocyanates such as polymethylene polyphenylisocyanate (available commercially as PAPI having an average of 3.1 isocyanate groups), triphenylmethane triisocyanate, 2,4-tolylene diisocyanate, 2,6-tolylene diisocyanate, bitolylene diisocyanate, dianisidine diisocyanate, hexamethylene diisocyanate, m-phenylene diisocyanate, 1-alkyl benzene-2,4-diisocyanate, 2,6-dialkylbenzene-1,4-diisocyanate, 1-chlorobenzene-2,4-diisocyanate, dicyclohexylmethane diisocyanate, 3,3 - dimethoxy diphenylmethane-4,4'-diisocyanate, 1 - nitrobenzene - 2,4 - diisocyanate, 1 - alkoxybenzene - 2,4 - diisocyanate, 1-alkylbenzene-2,6-diisocyanate, m-xylylene diisocyanate, 1,3-dimethyl-4,6-bis(β-isocyanatoethyl)-benzene diisocyanate, hexahydrobenzidine-4,4'-diisocyanate, ethylene diisocyanate, propylene-1,2-diisocyanate, cyclohexylene-1,2-diisocyanate, 3,3'-dichloro-4,4'-bisphenylene diisocyanate, 2,3-dimethyl tetramethylene diisocyanate, p,p'-diphenylene diisocyanate, 2-chlorotrimethylene diisocyanate, butane-1,2,2-triisocyanate, trimethylene diisocyanate, tetramethylene diisocyanate, butylene-1,2-diisocyanate, ethylidene diisocyanate, Mondur MR (polymethylene polyphenyl polyisocyanate having 31.5–32.0% available isocyanate groups), Mondur TM (triphenylmethane triisocyanate as a 20% solution in methylene chloride), Mondur MT-40 (polymethylene polyphenyl polyisocyanate with 40.0–0.4% available isocyanate groups.

Desmodur IL (this is a trimer of tolylene diisocyanate at 50% concentration in butyl acetate. It has an isocyanate group content of about 8%. It has the formula

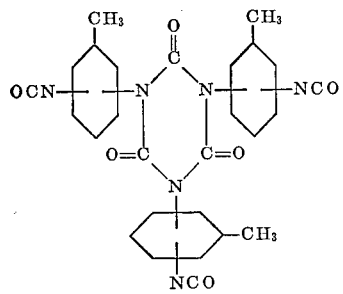

Also there can be used Mondur TD-80 (a mixture of 80% 2,4 and 20% 2,6-tolylene diisocyanate), Nopcothane D-123 (aliphatic amide blacked urethane prepolymer containing 5.7 percent blocked isocyanate at 70 percent solids in xylene-Cellosolve acetate), aromatic polyisocyanate ECD-819-30 of DuPont, 4,4'-diisocyanate dicyclohexyl methane.

The addition of the polyfunctional isocyanate to the molten resorcinol-formaldehyde resin is accompanied by a mild exotherm. When the polyisocyanate addition is complete at elevated temperature, the molten resin is poured and allowed to cool. The resulting resin normally has a melting point (ball and ring) of about 80-130° C.

When the isocyanate addition is carried out in the presence of solvent, the finished product can be removed from the reaction vessel in solution form for some uses or in solid form (e.g., by distillation of the solvent as set forth supra) for others. Since tire cord dip systems require essentially solventless, water-borne ingredients, the preferred form of the resin is a stable solid. Thus when the solid resin is desired the solvent is removed by distillation. The solid resin can contain 10 to 15% of unremoved solvent without materially affecting the end use of the resin.

Unless otherwise indicated all parts and percentages are by weight.

Example 1

To a three liter, three necked flask equipped with stirrer and reflux condenser there were charged 1000 grams of recorcinol, 140 grams of water, 20 grams of methanol and a slurry of 31.5 grams of barium hydroxide octahydrate and 60 grams of water. This mixture was heated to reflux and 400 grams of 37% aqueous formaldehyde was added over a 20-30 minute period. After addition was complete, the solution was refluxed for 1.5 hours. The resin was distilled to give a molten anhydrous resorcinol-formaldehyde resin. At 145° C. there was added 140 grams of polyphenyl polymethylene polyisocyanate (Mondur TM) over a 55 minute period. The resin was poured and allowed to solidify.

Example 2

A molten anhydrous resorcinol-formaldehyde resin was prepared as in Example 1. At 130° C. there was added 500 ml. of Cellosolve acetate to the molten resorcinol-formaldehyde resin over a 10 minute period. Then 265 grams of Mondur MR was added over a 40 minute period. The solvent was then removed by vacuum distillation and the resin poured and allowed to cool to room temperature.

Example 3

The reaction flask was charged with 1000 grams of resorcinol, 140 grams of water and 20 grams of methanol. At reflux, 338 grams of 37% aqueous formaldehyde were added slowly. The resin was distilled to form the molten anhydrous resin. 500 ml. of methyl isobutyl ketone were added to the molten resin and to the homogeneous mixture there was added 312 grams of Mondur MR. The solvent was removed by vacuum distillation and the resin poured and allowed to cool to a solid at room temperature.

Example 4

A molten resorcinol-formaldehyde resin was prepared as in Example 3. To the distilled, anhydrous, molten resin was added 300 grams of Mondur MR and the resin was poured and allowed to cool to room temperature.

Example 5

A molten resin was prepared as in Example 1 except that only 338 grams of the 37% aqueous formaldehyde was employed. To the anhydrous, molten resorcinol-formaldehyde resin there was added 570 grams of Mondur TM. The methylene chloride solvent contained in the Mondur TM was removed by distillation and the resulting isocyanate modified resin remaining in the flask was poured and cooled to room temperature.

Example 6

A resorcinol-formaldehyde resin was prepared as in Example 3 except that there were employed 1100 grams of resorcinol, 140 grams of water, 20 grams of methanol and 366 grams of 37% aqueous formaldehyde. To the molten, anhydrous resin there was added slowly 250 grams of Mondur MT-40 and the resin poured and allowed to cool to room temperature.

Example 7

To 1000 grams of anhydrous, molten resorcinol-formaldehyde resin prepared as in Example 3 ther was added 337 grams of Desmodur IL. During the addition the reaction mixture became exceedingly viscous and 250 ml. of methyl isobutyl ketone was therefore added. The solvents were then removed by distillation and the isocyanate modified molten resin poured and allowed to cool to room temperature.

Example 8

An anhydrous, molten resorcinol-formaldehyde resin was prepared as in Example 6 except that there was used 447 grams of 37% aqueous formaldehyde. To this molten resin there was added 250 ml. of methyl isobutyl ketone and 200 grams of Mondur TD-80. The solvent was removed by distillation and the resin product poured and allowed to cool to room temperature.

Example 9

A molten resorcinol-formaldehyde resin was made as in Example 3. To this resin there was added 500 ml. of a 50—50 mixture of xylene and Cellosolve acetate. Then there were added 859 grams of nopcothane D-123, the solvent distilled and the resin poured and allowed to cool to room temperature.

Example 10

To 1100 grams of anhydrous, molten resorcinol-formaldehyde resin prepared as in Example 8 there was added 500 ml. of methyl isobutyl ketone. To this solution there was added slowly 186 grams of DuPont ECD-819-30 aromatic polyisocyanate. When addition was complete, the solvent was removed by distillation and the resin poured and allowed to cool to room temperature.

The resorcinol-formaldehyde resins prepared above are water soluble before modification with the polyisocyanate.

What is claimed is:

1. In the process of forming an organic polyisocyanate modified resorcinol formaldehyde resin wherein the resorcinol formaldehyde resin has been formed by reacting resorcinol with aqueous formaldehyde the improvement comprising reacting the polyisocyanate with anhydrous molten resorcinol formaldehyde resin.

2. A process according to claim 1 carried out in the presence of an organic solvent.

3. A process according to claim 1 carried out in the absence of a solvent.

4. A process according to claim 1 including the steps of forming the resorcinol-formaldehyde resin by reacting 1 mole of resorcinol with 0.1 to 1 mole of aqueous formaldehyde, dehydrating the resin thus formed and adding the polyisocyanate to the dehydrated resin.

5. A process according to claim 4 wherein the mole ratio of formaldehyde to resorcinol is from 0.25 to 1 up to 0.65 to 1.

6. A process according to claim 5 wherein the reaction with the isocyanate is carried out in the presence of an organic solvent.

7. A process according to claim 5 wherein the reaction with the isocyanate is carried out in the absence of a solvent.

8. An essentially anhydrous product prepared by the process of claim 5.

9. An essentially anhydrous product prepared by the process of claim 1.

References Cited

UNITED STATES PATENTS

| 3,226,276 | 12/1965 | Rye et al. | 156—335 |
| 3,268,467 | 8/1966 | Rye et al. | 260—29.3 |

WILLIAM H. SHORT, *Primary Examiner.*

HOWARD SCHAIN, *Assistant Examiner.*

U.S. Cl. X.R.

117—131, 132, 138.8, 128.4, 163, 161; 156—331, 335; 260—31.2, 32.2, 32.8, 33.2, 33.6, 51.5